United States Patent [19]

Vetter et al.

[11] Patent Number: 5,015,136
[45] Date of Patent: May 14, 1991

[54] RIVET JOINT AND METHOD OF MANUFACTURE

[75] Inventors: Gregory J. Vetter; James G. Seaser, both of Owatonna, Minn.

[73] Assignee: Truth Incorporated, Owatonna, Minn.

[21] Appl. No.: 549,481

[22] Filed: Jul. 6, 1990

[51] Int. Cl.⁵ ............................................. F16B 19/06
[52] U.S. Cl. .................................. 411/504; 411/507; 29/444; 29/525.2
[58] Field of Search ...................... 411/504, 506, 507; 16/378; 29/442, 444, 525.2, 524.1

[56] References Cited

U.S. PATENT DOCUMENTS

| | | | |
|---|---|---|---|
| 2,696,018 | 12/1954 | Hollister | 411/504 |
| 3,479,727 | 11/1969 | Colautti et al. | 29/444 |
| 4,086,839 | 5/1978 | Briles | 411/507 |

*Primary Examiner*—Neill R. Wilson
*Attorney, Agent, or Firm*—Wood, Phillips, Mason, Recktenwald & Van Santen

[57] ABSTRACT

A rivet for pivotally interconnecting first and second superposed links each having an opening therethrough, including a first head having a link engaging surface and an outer concave surface, and a shank having first and second portions with a shoulder therebetween, with the first portion being adjacent the head and receivable in the first link opening and the second portion being receivable in the second link opening. During assembly, the rivet is compressed so that the second portion is deformed to form a second head to secure the links between the first and second heads, and the first head is deformed to reduce the concavity of the recess therein and axially shift the first link over the first shank portion to virtually eliminate axial free play.

15 Claims, 1 Drawing Sheet

RIVET JOINT AND METHOD OF MANUFACTURE

BACKGROUND OF THE INVENTION

1. Technical Field

The present invention is directed toward rivet joints, and more particularly toward window mechanism pivot joints having minimal axial free play.

2. Background Art

Pivotal connections between two members are common, including particularly in window opening mechanisms which have a number of pivotal connections between links. These connections most often consist of a conventional rivet having a flat head and a malleable tubular body or shank extending through cylindrical openings in the connected links. The malleable body is compressed to form a second head, securing the links between the two heads.

Further, such pivotal connections are commonly formed with a rivet shank having two sections and a shoulder therebetween, with the section adjacent the first head having the greater diameter and being slightly greater in length than its associated link is thick. The shoulder abuts the other link to prevent it from being frictionally bound against the first link during the formation of the second rivet head in assembly. Such binding would undesirably restrict the free pivoting of the links during operation.

Unfortunately, where the length of the rivet shank section is not precisely formed relative to the link thickness, there is an undesirable axial free play between the links. Such free play can cause excessive wear on the links and the components connected to the links. Excessive axial free play can also lead to jamming of the mechanism at the pivotal connection. Such jamming is obviously particularly undesirable when it results in window hinges or operators being stuck open. Further, inasmuch as pivoting at the joint stresses the pivotal connection, initial axial free play is naturally exacerbated and can eventually result in complete failure of the pivotal connection. Still further, the loose feel resulting from initial free play can cause potential users to believe that the mechanism is poorly constructed.

Some methods have been devised to minimize this axial free play, but they require either special tools or two separate operations significantly increasing the cost of manufacturing the connections. Thus, manufacturers have heretofore been forced to choose between either accepting undesirable axial free play or eliminating the axial free play by costly methods placing them at a competitive disadvantage.

The present invention is directed toward overcoming one or more of the problems set forth above.

SUMMARY OF THE INVENTION

In one aspect of the present invention, a rivet for pivotally interconnecting first and second superposed links each having an opening therethrough is provided. The rivet includes a first head with a link engaging surface and an outer surface, said outer surface having a concave recess therein. The rivet further includes a shank including first and second portions with a shoulder therebetween, with the first portion being adjacent the head and receivable in the first link opening and the second portion being receivable in the second link opening. During assembly, the second portion is deformed to form a second head to secure the links between the first and second heads and the first head is deformed to reduce the concavity of the recess therein. Deformation of the first head axially shifts the first link over the first shank portion to align one side of said link with the shank shoulder.

In another aspect of the present invention, a process is disclosed for forming a pivot connection between a pair of links, one link having a large diameter opening therethrough and the other link having a small diameter opening therethrough. The process includes the steps of inserting a rivet such as described above through the link openings, and compressing opposite ends of the rivet together to deform the concave rivet head to axially shift the adjacent link whereby one of its sides is aligned with the rivet shoulder.

In still another aspect of the present invention, pivotally interconnected links are provided formed by the above described method.

It is an object of the present invention to provide a pivotal link connection that has a minimal amount of axial free play and which is easy and inexpensive to assemble.

DESCRIPTION OF THE PREFERRED EMBODIMENT

Figure 1:
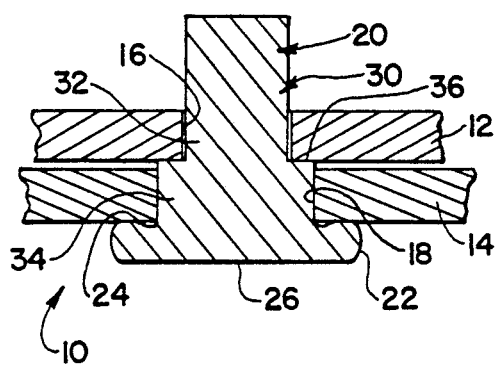
FIG. 1 is a cross-sectional view of a prior art pivotal connection prior to deformation of the rivet.
Figure 2:
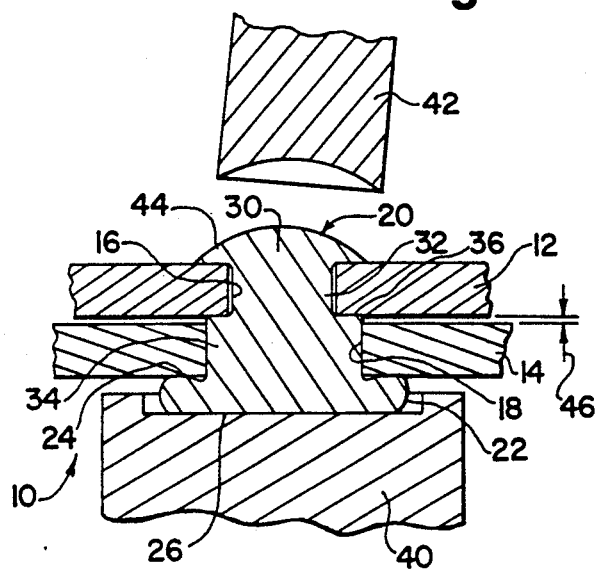
FIG. 2 is a cross-sectional view of the FIG. 1 connection, but showing the rivet after it has been deformed.

A prior art pivot joint or connection 10 (such as was referred to generally in the above Background Art section) between a first link 12 and a second link 14 is shown in FIGS. 1 and 2. Each of the links 12, 14 include openings 16, 18, where the opening 16 in the first link 12 is smaller than the opening 18 in the second link 14.

The links 12, 14 are interconnected by a rivet 20 having a head 22 with a top link engaging surface 24 and a flat bottom outer surface 26.

Extending from the top surface 24 is a shank 30 having first and second portions 32, 34 defining a shoulder 36 therebetween. The rivet second portion 34 fits within the opening 18 in the second link 14. The rivet second portion 34 has a larger diameter than the opening 16 of the first link 12 and a slightly greater axial length than the second link 14 is thick, so that the first link 12 abuts the rivet shoulder 36. (It should be understood, however, that references herein to one opening or rivet portion having a larger or smaller "diameter" than the other merely mean that they are larger or smaller in at least one transverse dimension sufficient to create some shoulder which prevents the first link 12 from fitting over the rivet second portion 34. For example, a square rivet first portion 32 having sides of a length less than the diameter of a cylindrical rivet second portion 34 would be within the scope of the present invention even if the corner to corner dimension of such a rivet first portion 32 were equal to or greater than the rivet second portion 34 diameter).

Preferably, the rivet second portion 34 and the second link opening 18 are cylindrical to permit pivoting between the rivet 20 and the second link 14. The rivet first portion 32 and the first link opening 16 should be shaped to prevent lateral movement between the rivet 20 and the first link 12, but since pivoting between the rivet 20 and the first link 12 would not be required, the rivet first portion 32 and first link opening 16 need not be cylindrical. Of course, the rivet first portion 32 and first link opening 16 could be cylindrical to alternatively or additionally provide for pivoting.

Prior to assembly, as shown in FIG. 1, the rivet first portion 32 is of sufficiently small diameter to pass through both link openings 16, 18, and is sufficiently long to project beyond the first link 12.

As shown in FIG. 2, the pivot joint 10 is formed by placing the above described assembly between an anvil 40 and a forming tool 42. The forming tool 42, which conventionally spins during operation, engages the tenon of the rivet first portion 32 projecting beyond the link 12 and compresses the rivet 20 between the tool 42 and anvil 40. This compression deforms the rivet first portion 32 to form a second head 44 which, together with the other head 22, secures the links 12, 14 together for pivoting about the rivet 20.

As is understood by those skilled in this art, the shoulder 36 on the rivet 20 engages the first link 12 in this assembly to prevent the compression of the rivet 20 from binding the links 12, 14 together (i.e., with their facing surfaces frictionally binding to undesirably interfere with free turning of the links 12, 14 relative to one another).

Unfortunately, while this prior art construction prevents the above described binding of the links 12, 14, it also results in undesirable axial free play in the joint 10 as shown in FIG. 2. Specifically, due to tolerances required in the manufacture of the link 14 and the rivet 20 (particularly the rivet head 22 and rivet second portion 34), and particularly inasmuch as these tolerances should ensure even at one extreme that the links 12, 14 will not bind when assembled, the assembled joint 10 has heretofore naturally had some undesirable axial spacing (indicated by the arrows 46) allowing some undesirable play in the joint. As discussed in more detail above, this axial free play results in many problems when, for example, the joint is incorporated into a window opening mechanism. While some methods have been devised to minimize this axial free play, they require either special tools or two separate operations, significantly increasing the cost and complexity of manufacturing the joints.

Figure 3:
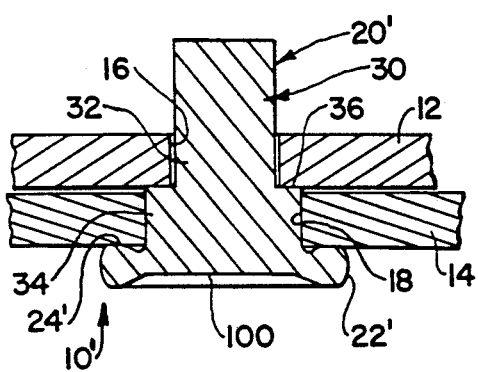
FIG. 3 a cross-sectional view of a pivotal connection of the present invention prior to deformation of the rivet.
Figure 4:
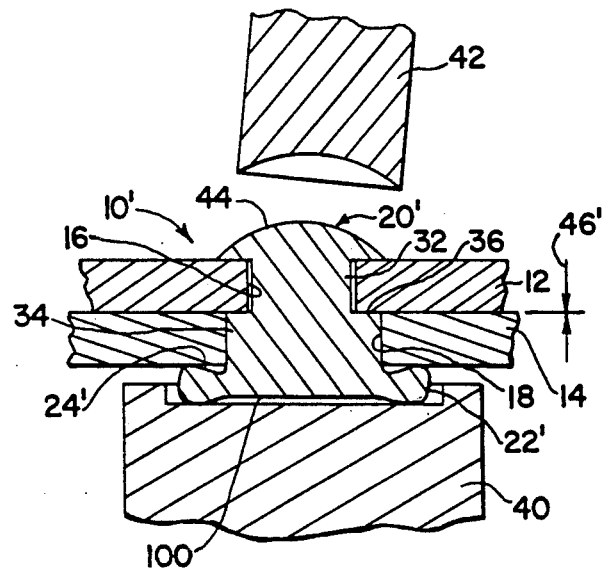
FIG. 4 is a cross-sectional view of the connection of the present invention after its rivet has been deformed.

The present invention as shown in FIGS. 3 and 4 prevents binding of the links 12, 14 together and, at the same time, virtually eliminates undesirable axial free play. For ease of reference and to avoid unnecessary repetition herein, where components in FIGS. 3 and 4 are identical to those in FIGS. 1 and 2, they are given identical reference numbers, and where components are modified from the prior art shown in FIGS. 1 and 2, they are given the same reference number "primed". For example, links 12, 14 in FIGS. 1 and 2 are identical to the links 12, 14 in FIGS. 3 and 4, whereas head 22 in FIGS. 1 and 2 is similar to but slightly different from head 22' in FIGS. 3 and 4.

Referring now to the present invention as illustrated in FIGS. 3 and 4, the rivet 20' of the present invention is formed with a head 22' having a concave recess 100 in its bottom outer surface 26' (the rivet 20' may be constructed from any suitable deformable material, such as the various metals presently used to make rivets).

As a result of this rivet configuration, the joint 10' can be assembled using the same inexpensive and simple procedures of the prior art described above. However, when the rivet 20' is compressed between the forming tool 42 and anvil 40 as shown in FIG. 4, the rivet first portion 32 is not only deformed to form a second head 44 securing the first link 12 between it and the shoulder 36, but the first head 22' also deforms to axially shift the second link 14 and virtually eliminate any axial play between the links 12, 14 (as indicated by the arrows 46'). When the compressive force of the forming tool 42 is removed, the first head 22' naturally springs back slightly so that the second link 14, while directly adjacent the first link 12 with no free play, will not frictionally bind against the first link 12.

As will become apparent to a person of ordinary skill in this art once an understanding of the present invention is obtained, the recess 100 is preferably formed with a depth at least as great as the maximum possible spacing between the links 12, 14 before assembly given the tolerances used to manufacture the components.

As will also become apparent to a person of ordinary skill in this art once an understanding of the present invention is obtained, the pivot joints 10' of the present invention can be used in a wide variety of uses and configurations. For example, such joints 10' can be used in window hinges and operators, and can be used in non-concentric joints (where the two rivet portions are not concentric).

As a result of the above described invention, pivot joints may be simply and inexpensively manufactured while at the same time minimizing wear, maximizing reliability of operation, and providing a secure feel of quality construction.

Still other aspects, objects, and advantages of the present invention can be obtained from a study of the specification, the drawings, and the appended claims.

We claim:

1. A rivet for pivotally interconnecting first and second superposed links each having an opening therethrough, comprising;
   a first head with a link engaging surface and an outer surface, said outer surface having a concave recess therein; and
   a shank including first and second portions with a shoulder therebetween, said first portion being adjacent said head and receivable in the first link opening and said second portion being receivable in the second link opening;
   wherein during assembly said second portion is deformed to form a second head to secure said links between said first and second heads and said first head is deformed to reduce the concavity of the recess therein.

2. The rivet of claim 1, wherein at least one of the shank portions is cylindrical and the shoulder faces away from the first head.

3. The rivet of claim 1, wherein deformation of the first head axially shifts said first link over said first shank portion to align one side of said first link with said shoulder.

4. The rivet of claim 1, wherein the first head springs back slightly after it is deformed.

5. An improved rivet for pivotally interconnecting first and second superposed links each having an opening therethrough, including a first head with a link engaging surface and an outer surface and a shank including first and second portions with a shoulder therebetween, said first shank portion being adjacent said head and receivable in the first link opening and said second shank portion being receivable in the second link opening and deformable during assembly to form a second head to secure said links between said first and second heads, the improvement comprising:

a concave recess in the outer surface of said first head, wherein said first head is deformable to reduce the concavity of the recess therein during assembly.

6. The rivet of claim 5, wherein at least one of the shank portions is cylindrical and the shoulder faces away from the first head.

7. The rivet of claim 5, wherein deformation of the first head axially shifts said first link over said first shank portion to align one side of said first link with said shoulder.

8. The rivet of claim 5, wherein the first head springs back slightly after it is deformed.

9. A process for forming a pivot connection between a pair of links, one link having a large diameter opening therethrough and the other link having a small diameter opening therethrough, comprising the steps of:

inserting a rivet having two ends through said link openings, said rivet including a first head on one end with a link engaging surface and an concave outer surface, a large diameter portion adjacent said first head and extending into said link large diameter opening, and a malleable small diameter portion at its other end and extending through said link small diameter opening; and compressing opposite ends of said rivet together.

10. The process of claim 9, wherein said compressing step deforms said rivet to form a second head in said small diameter portion securing said links between said first and second heads and to reduce the concavity of the first head outer surface 11. The process of claim 9, wherein a shoulder is defined between the rivet large and small diameter portions, and said compressing step deforms said first rivet head to axially shift the link having the large diameter opening to align one of its sides with said shoulder.

12. Links, one having a large diameter opening therethrough and the other having a small diameter opening therethrough, pivotally interconnected by the process of:

inserting a rivet having two ends through said link openings, said rivet including a first head on one end with a link engaging surface and an concave outer surface, a large diameter portion adjacent said first head and extending into said link large diameter opening, and a malleable small diameter portion at its other end and extending through said link small diameter opening; and compressing opposite ends of said rivet together.

13. The interconnected links of claim 12, wherein a second head is formed in said small diameter portion by said compressing step securing said links between said first and second heads, and the concavity of the first head outer surface is also reduced.

14. The interconnected links of claim 13, wherein a shoulder is defined between the rivet large and small diameter portions, and said compressing step interconnecting said links deforms said first rivet head to axially shift the link having the large diameter opening to align one of its sides with said shoulder.

15. The interconnected links of claim 14, wherein the first head springs back slightly after it is deformed.

* * * * *